United States Patent [19]

Moore et al.

[11] Patent Number: 4,850,708

[45] Date of Patent: Jul. 25, 1989

[54] METHOD AND APPARATUS FOR PLANAR ALIGNMENT OF A RING LASER GYROSCOPE FOR MINIMUM MAGNETIC BIAS SENSITIVITY

[75] Inventors: Robert H. Moore, Camarillo, Calif.; Denise Durance, Tucson, Ariz.

[73] Assignee: Litton Systems, Inc., Beverly Hills, Calif.

[21] Appl. No.: 202,476

[22] Filed: Jun. 6, 1988

[51] Int. Cl.[4] .............................................. G01B 11/26
[52] U.S. Cl. .................................... 356/350; 356/152; 356/364; 372/94
[58] Field of Search ............... 356/350, 152, 153, 364, 356/369, 351; 372/94

[56] References Cited

U.S. PATENT DOCUMENTS 4,386,853  6/1983  Ljung ................................. 356/350

Primary Examiner—Vincent P. McGraw
Assistant Examiner—S. A. Turner
Attorney, Agent, or Firm—Elliott N. Kramsky

[57] ABSTRACT

A method and apparatus for aligning the light path of a square ring laser gyroscope wherein the alignment method includes directing two input beams of light into the cavity of the gyroscope. Next, the input beams are intercepted prior to their incidence upon the input mirror with a pair of polarizers. Subsequently, the extinction ratios of the first and second output beams of light are measured at the exit mirror. The curved mirrors of the gyroscope are then translated in opposite directions and equal amplitude so as to change the extinction ratios of the output beams. Such translations are repeated until the measured extinction ratios are substantially equal.

12 Claims, 6 Drawing Sheets

METHOD AND APPARATUS FOR PLANAR ALIGNMENT OF A RING LASER GYROSCOPE FOR MINIMUM MAGNETIC BIAS SENSITIVITY

This invention was made with Government support under contract F04704-84-C-0057 awarded by the Ballistic Missiles Office of the Air Force Systems Command. The Government has certain rights in this invention.

BACKGROUND

1. Field of the Invention

This invention relates in general to optical rotation sensing devices. More particularly, this invention pertains to a method and apparatus for aligning the path of light beams transmitted about the optical cavity of a square ring laser gyroscope.

2. Description of the Prior Art

The conventional ring laser gyroscope with which the present invention is concerned includes planar top and bottom horizontal surfaces bordered by eight planar sides that form an octagon-shaped perimeter. Four non-adjacent sides form the mirror mounting surfaces. Each mounting surface should be substantially parallel to the opposed mounting surface and equidistant from the center of the frame to provide an optimum (maximum intensity) beam path. Due to unavoidable manufacturing tolerances of the fabrication process and inaccuracies introduced through polishing of the various surfaces, the perfect parallelism of the opposed mounting surfaces cannot be normally realized. Consequently, a beam path alignment process is required.

The planar alignment process is rendered difficult, if not impossible to achieve, due to the out-of-planeness of the square ring laser gyroscope. The "out-of-planeness" is herein defined as the non-planar deformation or tilt with respect to the horizontal surfaces of the gyroscope frame between two consecutive incident planes of the gyroscope. Such out-of-planeness is primarily induced by the imperfect parallelism of the opposed mirror mounting surfaces.

The combination of the out-of-planeness, which is caused by the non-planeness of the beam path, with certain unavoidable ambient magnetic fields possibly generated by nearby electromagnetic devices such as accelerometers can induce a magnetic bias sensitivity into the gyroscope output. For example, in a forty (40) centimeter ring laser gyroscope without the benefit of this invention, an arc-second of tilt angle produces output bias of between 0.01 to 0.04 degrees/hour/gauss. Such bias degrades the accuracy and thereby limits the gyroscope applications.

The out-of-planeness of the square ring laser gyroscope causes the cavity polarization state to be slightly elliptical (as opposed to linear), which in turn yields a magnetic bias sensitivity via the Faraday effect in the gain medium. The gyroscope magnetic bias sensitivity poses a great concern for high accuracy applications.

The cavity out-of-planeness can be varied by applying equal and opposite translations to two adjacent spherical mirrors. In principle, the cavity can be made perfectly planar, thus eliminating the major contributor to the gyroscope magnetic bias sensitivity.

One attempted technique for reducing the out-of-planeness errors caused by magnetic bias sensitivity is to modify the tolerance of the face angle errors of the gyroscope frame. Such attempt, however, has proven to be less than completely satisfactory in solving the magnetic bias sensitivity problem, since the errors resulting from the fabrication tolerances would still remain too large to be considered acceptable in practice.

Such attempted technique presents at least two potentially significant sources of error. The first source of error is the accuracy of the face angle measurement (about 0.5 arc-second). The second source of error is the uncertainty in the initial mirror alignment process. Additionally, there has been no relatively simple and inexpensive method to verify that a planar cavity has been achieved.

Theoretical and conceptual attempts have been made to calculate the derivation of the sensitivity of the square ring laser gyroscopes to magnetic fields and the relationship of this parameter to the cavity optical parameters such as out-of-planeness. The following results have been reached by the foregoing attempts. First, an elliptical polarization state must exist in the cavity in order for the magnetic field sensitivity to be present. In other words, a zero sensitivity corresponds to a purely linear polarization state.

The second result is that a perfectly planar beam path will yield a linear polarization state. In the general case where even a slight out-of-planeness exists, an elliptical polarization state is present. The degree of ellipticity varies continuously from zero, that is, in a linear polarization state, as out-of-planeness is introduced. The third result is that, if one of the two counter-propagating waves of the square ring laser gyroscope is purely linear in polarization, the other wave will also be linear in polarization.

One attempt to resolve the magnetic bias sensitivity utilizing the foregoing theoretical concept has been to determine the point at which a linear polarization state exists. This is done by first generating the passive cavity resonance using an external source laser wherein either the test cavity or the source are presumed to be tunable. The ratio of the p-polarization to the s-polarization component of the transmitted resonance signal is then measured. Finally, the p-polarization to the s-polarization ratio is then driven to a minimum value by moving the spherical mirrors in order to vary the out-of-planeness.

One of the most fundamental problems with such theoretical approach has been the cavity exit mirror which intervenes and which possesses non-negligible polarization properties. In fact, the following characteristics of the exit mirror act as a serious source of errors. First, the exit mirror acts as a polarization filter which transmits much more of the p-component relative to the s-component.

The second characteristic of the exit mirror is that the multi-layer dielectric mirror stack may possess a non-zero phase retardance between the s- and p-axes. The third and most important characteristic of the exit mirror is that the mirror substrate (which is generally made of material sold under the name Zerodur) has a non-zero birefringence due to the stresses in the material; that is, it changes ellipticity as the light beam passes therethrough.

The third characteristic is particularly important since it can, depending upon the orientation of the stress axis of the substrate material, introduce a sizeable ellipticity to a transmitted linearly polarized beam, thus invalidating the effectiveness of the foregoing theoretical attempt. The "ellipticity versus the out-of-planeness" curve would exhibit a minimum point, which will be displaced away from the zero out-of-planeness. Thus, the minimum measured out-of-planeness is not sufficiently accurate.

SUMMARY AND OBJECTS OF THE INVENTION

The foregoing and additional shortcomings of the prior art are addressed and overcome by the present invention that provides a method and apparatus for cavity alignment of a square ring laser gyroscope. The gyroscope includes a frame having an internal cavity that forms a square path with first and second curved or spherical mirrors fixed to adjacent corner surfaces of the frame.

The method for aligning the light path of a square ring laser gyroscope includes directing two input beams of light into the cavity of the gyroscope. Next, the input beams are intercepted prior to their incidence upon the input mirror with a pair of polarizers. Subsequently, the extinction ratios of the first and second output beams of light are measured at the exit mirror. The curved mirrors of the gyroscope are then translated in opposite directions and equal amplitude so as to change the extinction ratios of the output beams. Such translations are repeated until the measured extinction ratios are substantially equal.

The foregoing and additional advantages and features of the present invention will become apparent from the detailed description of the invention that follows. This description is accompanied by a set of drawing figures. Numerals point out the various features of the invention in the figures and in the detailed description. Like numerals refer to like features throughout.

DETAILED DESCRIPTION

Figure 1:
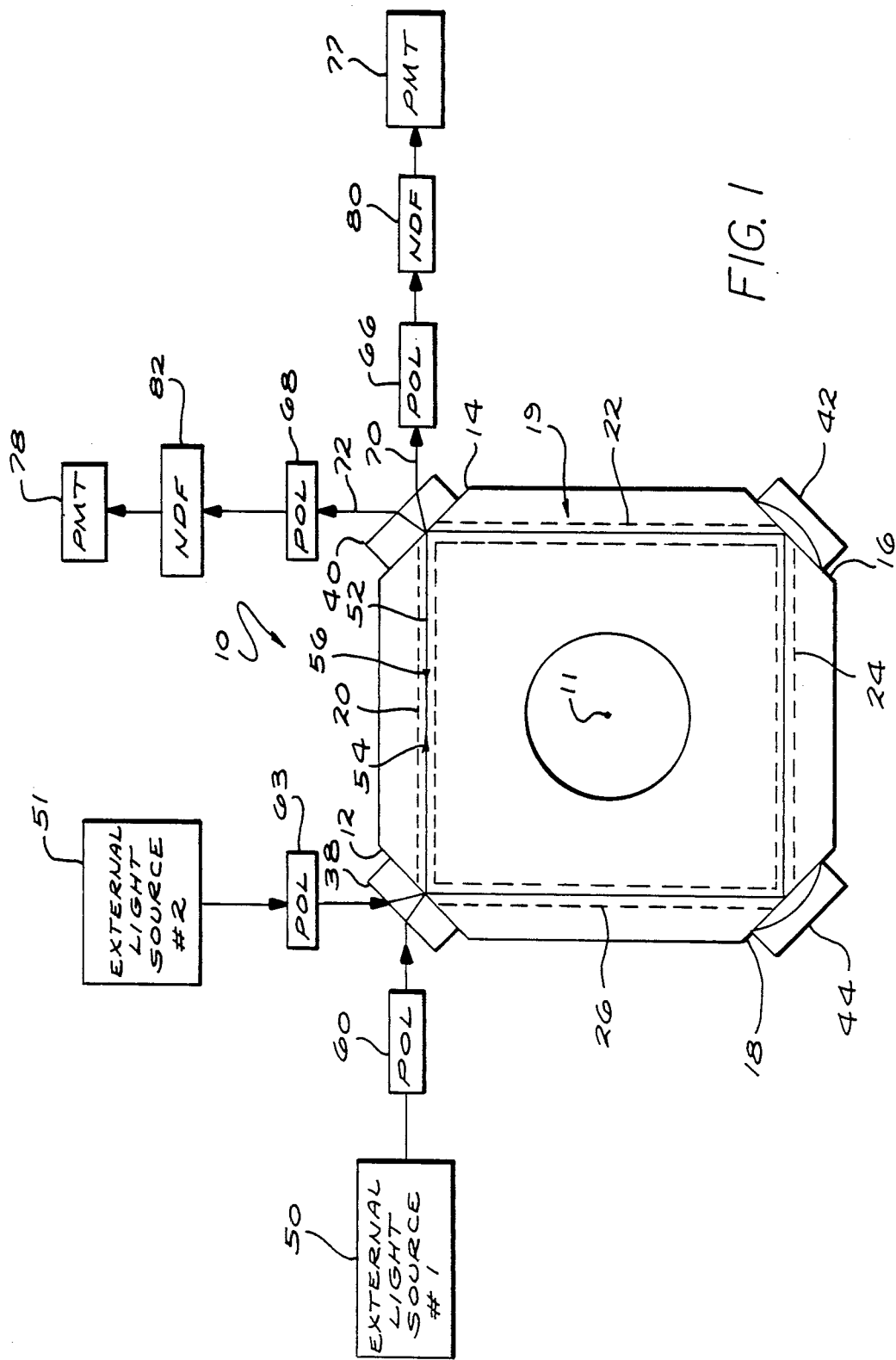
FIG. 1 is a diagrammatic plan view of an arrangement for aligning the beam path of a square ring laser gyroscope optical frame by the method of the present invention.

Turning now to the drawings, FIG. 1 is a top plan view of an arrangement used for cavity polarization measurements of the clockwise and counter-clockwise resonances for aligning the path of two counter-propagating light beams about the cavity of a gyroscope frame 10. The alignment process of the invention provides a substantially planar path wherein the ellipticity of the cavity resonances of the two counter-rotating light beams, after being transmitted through exit mirror 40, is equal, though not necessarily minimal. As a result, the cavity out-of-planeness is minimized, if not reduced to a zero value. Hence, a substantially planar cavity would be attained and the magnetic bias sensitivity is minimized or even reduced to zero.

The frame 10 is centered about a central point 11 that is somewhat doughnut-shaped with a generally octagonal outer periphery and a circular inner boundary. The frame 10 is preferably formed of glass ceramic or like material that is characterized by a low coefficient of thermal expansion. Representative frame materials include Pyrex and a glass ceramic material marketed under the trade names "Cer Vit" and "Zerodur."

Planar mirror mounting surfaces 12, 14, 16 and 18 are formed in the periphery of the frame 10. Generally, the opposed pairs of surfaces 12, 16, 14, 18, are not perfectly parallel to one another. Furthermore, the distances of the mounting surfaces from the center 11 vary. An internal optical cavity, generally indicated at 19, of the frame 10 comprises four substantially straight cavity segments 20, 22, 24 and 26.

Four mirrors 38, 40, 42 and 44 are provided for directing the counter-propagating light beams about the cavity 19. Of these mirrors, the input mirror 38 and the exit mirror 40 are planar and partially transmissive, while the mirrors 42 and 44 have concave and generally non-transmissive surfaces. In practice, such concave surfaces are also used to compensate for variations in the beam path length resulting from flexure or expansion of the frame 10 as a consequence of thermal effects.

The mirrors 38 and 40 are fixed to the adjacent mounting surfaces 12 and 14, respectively, by suitable conventional techniques. The concave mirrors 42 and 44 are fixed to the adjacent mounting surfaces 16 and 18, respectively. The curvatures of the mirrors 42 and 44 are greatly exaggerated, as shown, for purposes of illustration only. The radius of curvature of an actual concave or curved mirror, such as the mirror 42, is generally greater than 200 inches.

A pair of light sources 50 and 51, such as HeNe or GaAs lasers, are provided as elements of the alignment apparatus. In the alternative, only one light source 50 can be provided, and its output light can be split to supply the counter-rotating beam. The output of the source 50 is directed into the optical cavity within the frame 10 through the partially transmissive mirror 38. The light generated by the source 50 is then deflected by the gyroscope mirror arrangement about the cavity 19 in a beam path generally indicated by the line 52, in the direction of the arrow 54.

Similarly, the output of the source 51 is directed into the optical cavity 19 within the frame 10 through the partially transmissive mirror 38, and it is reflected by the mirror arrangement about the cavity 19 and a beam path that is also indicated by the line 52 in the direction of the arrow 56.

The outputs of the light sources 50 and 51 are incident upon the input mirror 38 such that they coincide with the optic axes of the two counter-propagating cavity resonances. It should be noted that only the s-polarization, or more precisely the s-like polarization state of the resonance is being referred to, since the actual ellipticities involved are substantially small. A pair of input linear polarizers 60 and 63, such as the Glan-Thompson prism polarizer can be disposed intermediate the external sources 50 and 51, respectively, and the mirror 38. The input polarizers 60 and 63 are oriented for s-polarization.

The resonant output signals of the cavity exit at the mirror 40. It is one object of the present invention to measure the ellipticity, that is the ratio of the major and the minor axes of the polarization ellipse, of the output signals.

A pair of output linear polarizers 66 and 68 are disposed at the output of the exit mirror 40 for receiving the two output signals generally indicated by the lines 70 and 72, respectively. A pair of photomultiplier tubes or detectors 77 and 78 is aligned with the polarizers 66 and 68 respectively so as to receive the output signals or light beams at the outputs thereof.

If the polarizers 60, 63, 66 and 68 were oriented for s-polarization state, the detected signals at the photomultipliers 77 and 78 will be proportional to the circular resonant intensity within the cavity 19. A pair of neutral density filters 80 and 82 is generally required to keep the photomultiplier tubes 77 and 78 respectively below their saturation levels. The usefulness of this particular arrangement is primarily to verify the calibration of the detector optics, such as the photomultiplier tubes 77 and 78. In fact, if the source lasers were properly aligned and the photomultiplier tubes 77 and 78 and the associated optics were properly calibrated, the resonant signal levels of the output signals 70 and 72 should be substantially equal in intensity.

In order to determine the relative ellipticities of the output beams, the two output polarizers 66 and 68 are oriented for p-polarization, whereas the two input polarizers 60 and 63 remain oriented for maximum s-polarization, or, in the alternative, for a minimum p-polarization input. The neutral density filters 80 and 82 are then removed, and the orientations of the two output polarizers 66 and 68 are carefully adjusted for a minimum value. The ratio of this minimum value for each of the two output beams 70 and 72 to the respective value obtained when the output polarizers were oriented for s-polarization is the desired ellipticity datum.

This measurement is repeated for a series of concave mirror positions. The out-of-planeness of the cavity 19 is varied from an initial alignment by translation of one of the two spherical mirrors 42 and 44 in the out-of-plane direction by a small increment followed by an equal and opposite translation of the other mirror. This change in the cavity out-of-planeness will result in changes in the extinction ratios or ellipticities measured for the output beams 70 and 72. The variation of the spherical mirror positions is continued until the two measured extinction ratios are equal. With the exception of a particular case, which will be described below, the point at which the extinction ratios are equal will correspond to the minimum out-of-planeness, at which point the cavity 19 is rendered substantially planar and the magnetic bias sensitivity is minimized.

Figure 2:
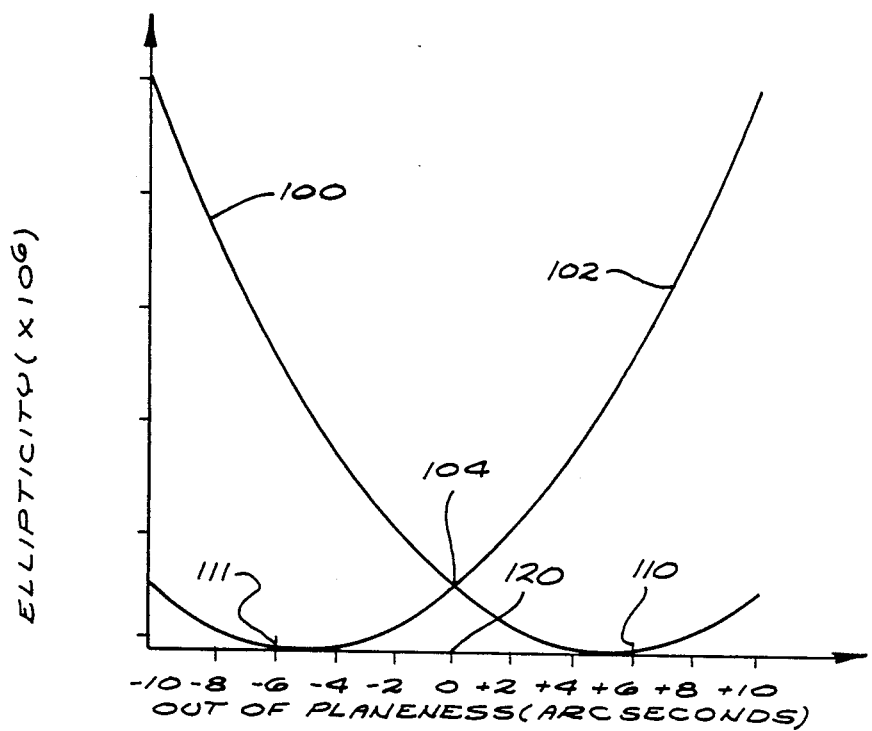
FIG. 2 is a graphical representation of the ellipticity of the two cavity resonances relative to the out-of-planeness.

FIG. 2 is a graphical representation of the ellipticity of the two cavity resonances relative to the out-of-planeness for the following parameters: reflection differential retardance of 10.0 degrees for each of the mirrors 38, 40, 42 and 44; s-reflectivity of 0.99995 for each of the mirrors 38, 40, 42 and 44; p-reflectivity of 0.99700 for each of the mirrors 38, 40, 42 and 44; transmission differential retardance of 25 degrees for the exit mirror 40; p/s transmission ratio of 25; substrate retardance angle of 0.5 degrees for the exit mirror 40; and angle between the cavity s polarization axis and the mirror substrate stress axis of 45.0 degrees.

FIG. 2 illustrates the effect of the polarization properties of the exit mirror 40 for an equal and opposite displacement of the clockwise and counter-clockwise ellipticity curves 100 and 102. Thus, while the minimum values 110 and 111 of the ellipticity curves 100 and 102, respectively, are not substantially accurate readings of the zero out-of-planeness, the intersection point 104 of the two curves 100 and 102 is a theoretical accurate value thereof.

In general, the two curves 100 and 102 intersect at the point 104 which is indicative of the zero out-of-planeness. However, as the retardance of the exit mirror 40 approaches zero, the two curves 100 and 102 approach one another. In the limit, the intersection point 104 approaches the minimum value of the superimposed curves. Thus, if the two curves 100 and 102 are found to be superimposed, the optimum alignment point will generally correspond to the minimum extinction ratio.

Therefore, the foregoing inventive technique involves the comparison of the clockwise and counter-clockwise cavity resonances. The following assumptions have been made in considering the relationship of the polarizations of the two resonances and the manner in which they are affected when they both exit through the same exit mirror 40. The first assumption is that the polarization states of the oppisitely directed resonances incident upon the exit mirror are either both purely linear or both elliptical, but of opposite helicity. In other words, the polarization state of one resonance is right-handed, while the polarization state of the other resonance is left-handed. The second assumption is that the retardance effects introduced by the exit mirror 40 are substantially identical for both transmitted beams.

As a consequence of the foregoing conditions, the following results are obtained. First, even though the measured ellipticities of the two cavity resonances are equal, the opposite helicities of the polarization states provide a method for differentiation of the two cavity resonances, since they will be affected somewhat differently by the exit mirror 40. Particularly, the "shifts" of the respective "ellipticity versus out-of-planeness" curves 100 and 102, as illustrated in FIG. 2, are equal and opposite in that the minimum values 110 and 111 of the measured ellipticity of the two resonances will be displaced by an equal and opposite amount in a symmetrical disposition relative to the zero point 120 of the out-of-planeness axis.

Secondly, the two curves 100 and 102 are substantially identical except for the indicated shifts along the out-of-planeness axis. The result of such shifts is that the two curves 100 and 102 almost always intersect, and the measured ellipticities will be equal, even though not necessarily minimum, when the out-of-planeness is zero at the intersection point 104. Thus, an alignment of the spherical mirrors 42 and 44 which equalizes the two measured ellipticities of the cavity resonances results in minimum cavity out-of-planeness.

It has been experimentally verified that the variation of cavity out-of-planeness varies the measured magnetic sensitivity and, in fact, the sensitivity can be minimized if not completely cancelled. The theoretical and experimental results of the cavity polarization measurement indicate that the present inventive technique can provide a method for varying the occurrence of the zero out-of-planeness point and, hence, allows for a greater precision compared to previous alignment techniques.

Several advantages flow from the present alignment technique, among which is the increase in the high accuracy gyroscope yield, since failures due to high magnetic bias sensitivity would be substantially reduced if not completely eliminated. Furthermore, the achievable magnetic sensitivity limits can be reduced since an overall reduction in the average gyroscope sensitivity is obtained, hence allowing a more favorable trade-off with other error terms. Moreover the tight-face angle tolerances can now be reduced since such errors, within a certain range, can be compensated, therefore reducing the overall cost of the frame 10.

A brief theoretical exposition of the invention follows. While such exposition is believed to be correct and to provide a theoretical verification of the foregoing, neither the operation nor the utility of the disclosed invention is dependent upon the theoretical explanation which follows.

Passive Cavity Polarization States

The following calculations seek to find expressions for passive cavity polarization states. The internal cavity states are dependent upon the mirror reflectivities (S and P) and differential retardance ($\gamma$) as well as the cavity out-of-planeness ($\epsilon$).

A string of matrices combining the effect of these properties is formed which yields the total cavity matrix:

$$\begin{pmatrix} a & b \\ c & d \end{pmatrix}.$$

The eigenvalues and eigenvectors of this matrix are determined and verified with the assumption that $\epsilon$ and $\gamma$ are both $<<1$ and that $(\epsilon/\gamma)^2 << 1$ as well.

Reflection properties are examined and conclusions drawn in regard to the oppositely-directed beams incident on a given mirror (i.e., determination of their respective helicities).

The effect of the output mirror and substrate on the transmitted resonances is calculated; specific examples of interest are considered.

Finally, the approximate solutions obtained are compared with computer solutions and their agreement demonstrated.

$$\begin{pmatrix} a & b \\ c & d \end{pmatrix} = \begin{pmatrix} \cos\epsilon & \sin\epsilon \\ -\sin\epsilon & \cos\epsilon \end{pmatrix} \begin{pmatrix} R_{s1}e^{i\gamma 1/2} & 0 \\ 0 & -R_{p1}e^{-i\gamma 1/2} \end{pmatrix} \begin{pmatrix} \cos\epsilon & -\sin\epsilon \\ \sin\epsilon & \cos\epsilon \end{pmatrix} \begin{pmatrix} R_{s2}e^{i\gamma 2/2} & 0 \\ 0 & -R_p e^{-i\gamma 2/2} \end{pmatrix}.$$

$$\begin{pmatrix} \cos\epsilon & \sin\epsilon \\ -\sin\epsilon & \cos\epsilon \end{pmatrix} \begin{pmatrix} R_{s3}e^{i\gamma 3/2} & 0 \\ 0 & -R_p e^{-i\gamma 3/2} \end{pmatrix} \begin{pmatrix} \cos\epsilon & -\sin\epsilon \\ \sin\epsilon & \cos\epsilon \end{pmatrix} \begin{pmatrix} R_{s4}e^{i\gamma 4/2} & 0 \\ 0 & -R_p e^{-i\gamma 4/2} \end{pmatrix}$$

Let $R_{si}=R_{pi}=1$ and $\epsilon<<1$; then:

$$\begin{pmatrix} a & b \\ c & d \end{pmatrix} =$$

$$\begin{pmatrix} 1 & \epsilon \\ -\epsilon & 1 \end{pmatrix} \begin{pmatrix} e^{i\gamma 1/2} & 0 \\ 0 & -e^{-i\gamma 1/2} \end{pmatrix} \begin{pmatrix} 1 & -\epsilon \\ \epsilon & 1 \end{pmatrix} \begin{pmatrix} e^{i\gamma 2/2} & 0 \\ 0 & -e^{-i\gamma 2/2} \end{pmatrix}.$$

$$\begin{pmatrix} 1 & \epsilon \\ -\epsilon & 1 \end{pmatrix} \begin{pmatrix} e^{i\gamma 3/2} & 0 \\ 0 & -e^{-i\gamma 3/2} \end{pmatrix} \begin{pmatrix} 1 & -\epsilon \\ \epsilon & 1 \end{pmatrix} \begin{pmatrix} e^{i\gamma 4/2} & 0 \\ 0 & -e^{-i\gamma 4/2} \end{pmatrix}$$

which yields: (neglecting terms in $\epsilon^2$)

$$a = e^{i/2(\gamma 1+\gamma 2+\gamma 3+\gamma 4)} = e^{i/2(\Sigma\gamma)}$$

$$b = \epsilon\{e^{i\gamma 1/2}[e^{i\gamma 2/2}(e^{-i/2(\gamma 3+\gamma 4)}) + e^{i/2(\gamma 3+\gamma 4)} + e^{-i/2(\gamma 2+\gamma 3+\gamma 4)}] + e^{-i/2(\Sigma\gamma)}\}$$

$$c = -\epsilon\{e^{-i\gamma 1/2}[e^{-i\gamma 2/2}(e^{-i/2(\gamma 3+\gamma 4)} + e^{-i/2(\gamma 3-\gamma 4)}) + e^{-i/2(\gamma 2+\gamma 3+\gamma 4)}] + e^{i/2(\Sigma\gamma)}\}$$

-continued $$d = e^{-i/2(\gamma 1+\gamma 2+\gamma 3+\gamma 4)} = e^{-i/2(\Sigma\gamma)}$$

For $\gamma_i = \gamma$ (assume equal birefringences), $$b = \epsilon(1 + e^{i\gamma} + e^{-i\gamma} + e^{-2i\gamma}) = 4\epsilon$$

if $$\gamma << 1, \text{ or } \doteq \epsilon(4-2i\gamma) \doteq 4\epsilon e^{-i\gamma/2}$$

and $$c = -\epsilon(1 = e^{-i\gamma} + e^{i\gamma} + e^{2i\gamma})$$

and the product $$bc = -\epsilon^2(4 + 6\cos\gamma + 4\cos 2\gamma + 2\cos 3\gamma) = -16\epsilon^2[1-(5/4)\gamma^2]$$

which for small $\gamma$, is approximated as $$bc \doteq -16\epsilon^2$$

Eigenvalues of $$\begin{pmatrix} a & b \\ c & d \end{pmatrix},$$

$\lambda\pm$, are given by:

$$\lambda\pm = \frac{a+d}{2} \pm \left(\frac{1}{2}\sqrt{(a-d)^2 + 4bc}\right)$$

$$= \frac{a+d}{2} \pm \frac{1}{2}(a-d)\sqrt{1 + \frac{4bc}{(a-d)^2}}$$

$$a - d = e^{i/2(\Sigma\gamma)} - e^{-i/2(\Sigma\gamma)} = 2i\sin(\Sigma\gamma/2) = 2i\sin 2\gamma$$

$(\gamma_i = \gamma)$

Thus, $\lambda\pm \doteq \frac{a+d}{2} \pm \frac{1}{2}(a-d)\sqrt{1 + \frac{(-64\epsilon^2)}{(-4\sin^2 2\gamma)}}$ For small $\gamma$, $\sin^2 2\gamma = (2\gamma)^2 = 4\gamma^2$ so, $$\lambda_{\pm} \doteq \frac{a+d}{2} \pm \frac{1}{2}(a-d)\sqrt{1 + \frac{64\epsilon^2}{16\gamma^2}}$$

$$= \frac{a+d}{2} \pm \frac{1}{2}(a-d)\sqrt{1 + 4\frac{\epsilon^2}{\gamma^2}}$$

$$= \frac{a+d}{2} \pm \frac{1}{2}(a-d)\left[1 + 2\frac{\epsilon^2}{\gamma^2}\right] \quad \left[\frac{\epsilon^2}{\gamma^2} << 1\right]$$

$$\begin{pmatrix} a & b \\ c & d \end{pmatrix} \begin{pmatrix} e_1 \\ e_2 \end{pmatrix}_{\pm} = \lambda_{\pm} \begin{pmatrix} e_1 \\ e_2 \end{pmatrix}_{\pm} \quad \text{(neglect terms in } \epsilon^2\text{)}$$

$$\begin{pmatrix} e^{2i\gamma} & \epsilon(1 + e^{i\gamma} + e^{-i\gamma} + e^{-2i\gamma}) \\ -\epsilon(1 + e^{-i\gamma} + e^{i\gamma} + e^{2i\gamma}) & e^{-2i\gamma} \end{pmatrix} \begin{pmatrix} \frac{i\epsilon}{\gamma} e^{i\gamma/2} \\ 1 \end{pmatrix} \doteq \begin{pmatrix} \epsilon\left(1 + e^{i\gamma} + e^{-i\gamma} + e^{-2i\gamma} + i\frac{e^{(5/2)i\gamma}}{\gamma}\right) \\ e^{-2i\gamma} \end{pmatrix}$$

$$= \begin{pmatrix} \frac{\epsilon}{\gamma}\left(\gamma + \gamma + \gamma + \gamma + i\left(1 + \frac{5}{2}i\gamma\right)\right) \\ e^{-2i\gamma} \end{pmatrix} = \begin{pmatrix} \frac{\epsilon}{\gamma}\left(4\gamma + i - \frac{5}{2}\gamma\right) \\ e^{-2i\gamma} \end{pmatrix}$$

$$= \begin{pmatrix} \frac{i\epsilon}{\gamma}\left(1 - \frac{3}{2}i\gamma\right) \\ e^{-2i\gamma} \end{pmatrix} = \begin{pmatrix} \frac{i\epsilon}{\gamma} e^{-3/2 i\gamma} \\ e^{-2i\gamma} \end{pmatrix} = e^{-2i\gamma}\begin{pmatrix} \frac{i\epsilon}{\gamma} e^{i\gamma/2} \\ 1 \end{pmatrix} \doteq \lambda_{-}\begin{pmatrix} e_1 \\ e_2 \end{pmatrix}_{-}$$

$$\lambda_+ = \frac{1}{2}\left[a + d + a - d + (a-d)\left(2\frac{\epsilon^2}{\gamma^2}\right)\right]$$

$$= \frac{1}{2}\left[2a + 2(a-d)\frac{\epsilon^2}{\gamma^2}\right] (\doteq a)$$

and $$\lambda_- = \frac{1}{2}\left[a + d - a + d - 2(a-d)2\frac{\epsilon^2}{\gamma^2}\right]$$

$$= \frac{1}{2}\left[2d - 2(a-d)\frac{\epsilon^2}{\gamma^2}\right] (\doteq d)$$

The eigenvectors, $$\begin{pmatrix} e_1 \\ e_2 \end{pmatrix}$$

are determined from $\lambda_{\pm}$:

$$\left(\frac{e_1}{e_2}\right)_{\pm} = \frac{\lambda_{\pm} - a}{b}; \quad \text{(where } b = 4\epsilon e^{-i\gamma/2}\text{)}$$

Thus, $$\left(\frac{e_1}{e_2}\right)_+ = \frac{(a-d)\epsilon^2}{4\epsilon\gamma^2 e^{-i\gamma/2}} = \left(\frac{i\epsilon}{\gamma}\right)e^{i\gamma/2}$$

and

-continued $$\left(\frac{e_1}{e_2}\right)_- = \frac{(d-a) - (a-d)\frac{\epsilon^2}{\gamma^2}}{4\epsilon e^{-i\gamma/2}} = \frac{-2i\sin 2\gamma}{4\epsilon e^{-i\gamma/2}}$$

$$\doteq \frac{-i\gamma}{\epsilon} e^{i\gamma/2}$$

Verification of Eigenvalues/Vectors

A Similar Exercise Shows That $$\begin{pmatrix} a & b \\ c & d \end{pmatrix}\begin{pmatrix} 1 \\ \frac{i\epsilon}{\gamma} e^{-i\gamma/2} \end{pmatrix} \doteq e^{2i\gamma}\begin{pmatrix} 1 \\ \frac{i\epsilon}{\gamma} e^{-i\gamma/2} \end{pmatrix} = \lambda_+\begin{pmatrix} e_1 \\ e_2 \end{pmatrix}_+$$

Thus, the "s-like" resonance (immediately above) possesses the eigenvalue $e^{+2i\gamma}$ while the "P-like" has $e^{-2i\gamma}$. These represent the phase shifts of these modes, the relative phase difference being $4\gamma$.

The sign difference between $(e_1/e_2)_{\pm}$ indicates that the two are of opposite helicity (though the actual ellipticity values ($=\epsilon/\gamma$) are equal.

Second Order Correction (in $\gamma$)

If terms of order $\gamma^2$ are included, the ellipticity is modified by a factor of approximately $(1-(\frac{3}{4})\gamma^2)$, nearly unity in cases of interest.

Eigenvector Propagation Through Cavity (Reflections)

$$\begin{pmatrix} 1 & -\epsilon \\ \epsilon & 1 \end{pmatrix}\begin{pmatrix} e^{i\gamma/2} & 0 \\ 0 & -e^{-i\gamma/2} \end{pmatrix}\begin{pmatrix} \frac{i\epsilon}{\gamma} e^{i\gamma/2} \\ 1 \end{pmatrix} = \quad (\#1)$$

[neglect terms in $\epsilon^2$.]

$$\begin{pmatrix} \epsilon e^{-i\gamma/2} + \frac{i\epsilon}{\gamma} e^{i\gamma} \\ -e^{-i\gamma/2} \end{pmatrix} =$$

$$e^{-i\gamma/2}\begin{pmatrix} \frac{\epsilon}{\gamma}(ie^{3i\gamma/2} + \gamma) \\ -1 \end{pmatrix} \doteq$$

-continued $$e^{-i\gamma/2}\left(\begin{array}{c}\frac{\epsilon}{\gamma}\left(i\left(1+\frac{3i\gamma}{2}\right)+\gamma\right)\\-1\end{array}\right)=$$

$$e^{-i\gamma/2}\left(\begin{array}{c}\frac{i\epsilon}{\gamma}\left(1+\frac{3i\gamma}{2}-i\gamma\right)\\-1\end{array}\right)=$$

$$e^{-i\gamma/2}\left(\begin{array}{c}\frac{i\epsilon}{\gamma}\left(1+\frac{i\gamma}{2}\right)\\-1\end{array}\right)\doteq e^{-i\gamma/2}\left(\begin{array}{c}\frac{i\epsilon}{\gamma}e^{i\gamma/2}\\-1\end{array}\right)$$

Note the following (1) phase shift of $-\gamma/2$
(2) helicity change ($1\rightarrow -1$)
(3) ellipticity mag. unchanged Refl. #2: [neglect terms in $\epsilon^2$]

$$e^{-i\gamma/2}\begin{pmatrix}1 & \epsilon\\-\epsilon & 1\end{pmatrix}\begin{pmatrix}e^{i\gamma/2} & 0\\0 & -e^{-i\gamma/2}\end{pmatrix}\begin{pmatrix}\frac{i\epsilon}{\gamma}e^{i\gamma/2}\\-1\end{pmatrix}=$$

$$e^{-i\gamma/2}\begin{pmatrix}\frac{i\epsilon}{\gamma}e^{i\gamma}+\epsilon e^{-i\gamma/2}\\e^{-i\gamma/2}\end{pmatrix}=e^{-i\gamma}\begin{pmatrix}\frac{i\epsilon}{\gamma}(e^{3/2\,i\gamma}-i\gamma)\\1\end{pmatrix}\doteq$$

$$e^{-i\gamma}\begin{pmatrix}\frac{i\epsilon}{\gamma}\left(1+\frac{3}{2}i\gamma-i\gamma\right)\\1\end{pmatrix}=e^{-i\gamma}\begin{pmatrix}\frac{i\epsilon}{\gamma}\left(1+\frac{i\gamma}{2}\right)\\1\end{pmatrix}\doteq$$

$$e^{-i\gamma}\begin{pmatrix}\frac{i\epsilon}{\gamma}e^{i\gamma/2}\\1\end{pmatrix}.$$

Note:
(1) phase shift now $-\gamma$
(2) helicity reversed again
(3) ellipticity mag. unchanged.

In general, (to within the accuracy of the approximation) it can be concluded that the ellipticity, except for its sign, remains essentially constant (recall that we assumed $\gamma_i = \gamma$). Since $\gamma$'s are small, any variation due to differences in mirror birefringence will be slight.

Ellipticity and helicity of oppositely directed beam in a given leg

It can be readily seen that a rearrangement of the matrices (at beginning of App.) for the oppositely directed beam will appear nearly identical ($\gamma_i = \gamma$, $R_{si} = R_{pi} = 1$). The only difference is that the sign(s) of the $\epsilon$ terms is reversed. At first, thus, it appears as though the resulting eigenvectors will possess opposite helicity from the corresponding original (direction) vectors. However, the rotation associated with out-of-planeness ($\epsilon$) is opposite in sense when reflecting at a given face in the opposite direction:

$$\begin{pmatrix}1 & \epsilon\\-\epsilon & 1\end{pmatrix}_{face\,"A"\,CW}\cdot\begin{pmatrix}1 & -\epsilon\\\epsilon & 1\end{pmatrix}_{face\,"A"\,CCW}=\begin{pmatrix}1 & 0\\0 & 1\end{pmatrix}=$$

$$I\cdot\text{[neglecting terms in }\epsilon^2\text{]}$$

When this sign change is applied, it becomes obvious that the result is identical for (same leg) pairs of oppositely directed (CW/CCW) resonances.

Conclusion: Two oppositely-directed beams incident on a given mirror (i.e., from two adjacent legs) are of opposite helicity. [Recall that helicity alternates at each reflection.]

Effect of Output (Exit) Mirror

The following effects will modify the resulting ellipticity measured for the beam(s) transmitted through one of the cavity mirrors:
(1) P:S transmission ratio
(2) S/P differential retardance upon transmission
(3) Birefringence (due to stress) of the substrate material. (Orientation of stress axis will be important.)

The first two above can be combined into one transmission matrix for the coating:

$$\begin{pmatrix}1 & 0\\0 & R_T e^{-i\psi}\end{pmatrix},$$

where $R_T = P/S$ transmission ratio
and $\psi$ = retardation angle (of coating upon transmission).

$$\begin{pmatrix}1 & 0\\0 & R_T e^{-i\psi}\end{pmatrix}\begin{pmatrix}1\\\frac{i\epsilon}{\gamma}e^{-i\gamma/2}\end{pmatrix}=\begin{pmatrix}1\\\frac{iR_T\epsilon}{\gamma}e^{-i(\psi+\gamma/2)}\end{pmatrix};$$

Let $\xi$ be the angle between the S-polarization axis and the substrate "fast" axis. The matrix characterizing the effect of the substrate birefringence (ret. angle $=\eta$) is given by the following product:

$$\begin{pmatrix}\cos\xi & -\sin\xi\\\sin\xi & \cos\xi\end{pmatrix}\begin{pmatrix}1 & 0\\0 & e^{-i\eta}\end{pmatrix}\begin{pmatrix}\cos\xi & \sin\xi\\-\sin\xi & \cos\xi\end{pmatrix};$$

which, if $\eta = 0$, reduces to the identity matrix.

$$\begin{pmatrix}\cos\xi & -\sin\xi\\\sin\xi & \cos\xi\end{pmatrix}\begin{pmatrix}1 & 0\\0 & e^{-i\eta}\end{pmatrix}\begin{pmatrix}\cos\xi & \sin\xi\\-\sin\xi & \cos\xi\end{pmatrix}\begin{pmatrix}1\\\frac{iR_T\epsilon}{\gamma}e^{-i(\psi+\gamma/2)}\end{pmatrix}=$$

$$\begin{pmatrix}(\cos^2\xi+e^{-i\eta}\sin^2\xi)+\frac{iR_T\epsilon}{\gamma}e^{-i(\psi+\gamma/2)}\sin\xi\cos\xi(1-e^{-i\eta})\\\sin\xi\cos\xi(1-e^{-i\eta})+\frac{iR_T\epsilon}{\gamma}e^{-i(\psi+\gamma/2)}(\sin^2\xi+e^{-i\eta}\cos^2\xi)\end{pmatrix}$$

Note the following:
(1) If $\eta = 0$, the above reduces to $$\left(\begin{array}{c} 1 \\ \frac{iR_{T\epsilon}}{\gamma} e^{-i(\psi+\gamma/2)} \end{array}\right),$$

indicating no effect due to the substrate (as expected).

②  If $\xi=0$, it reduces to $$\left(\begin{array}{c} 1 \\ \frac{iR_{T\epsilon}}{\gamma} e^{-i(\psi+\gamma/2+\eta)} \end{array}\right)$$

which is essentially just a retardation of $-\eta$. If $\xi=\pi/2$, it becomes $$\left(\begin{array}{c} e^{-i\eta} \\ \frac{iR_{T\epsilon}}{\gamma} e^{-i(\psi+\gamma/2)} \end{array}\right); \text{ [ret. of } +\eta].$$

Since $\eta$ is typically small (perhaps a few degrees), the net effect on the measured ellipticity will be minimal in this case.

③  $\epsilon=0$: matrix reduces to $$\left(\begin{array}{c} \cos^2\xi + e^{-i\eta}\sin^2\xi \\ \sin\xi\cos\xi(1-e^{-i\eta}) \end{array}\right),$$

a result which is independent of $\psi$ and $\gamma$. Note that it will represent a linear state only if $\eta=0$ or $\xi=n\pi/2$.

④  Example: $\xi=45°$
matrix becomes $$\frac{1}{2}\left(\begin{array}{c} [1+e^{-i\eta}] + \frac{iR_{T\epsilon}}{\gamma} e^{-i(\psi+\gamma/2)}(1-e^{-i\eta}) \\ (1-e^{-i\eta}) + [1+e^{-i\eta}]\frac{iR_{T\epsilon}}{\gamma} e^{-i(\psi+\gamma/2)} \end{array}\right)$$

For small $\eta$ of this becomes:

$$\frac{1}{2}\left(\begin{array}{c} 2 - i\eta\left(1 + \frac{iR_{T\epsilon}}{\gamma} e^{-i(\psi+\gamma/2)}\right) \\ i\eta\left(1 - \frac{iR_{T\epsilon}}{\gamma} e^{-i(\psi+\gamma/2)}\right) + 2\frac{iR_{T\epsilon}}{\gamma} e^{-i(\psi+\gamma/2)} \end{array}\right);$$

Let $\psi$ and $\gamma$ be sufficiently small to approximate the exponential by 1. Then the previous becomes:

$$\frac{1}{2}\left(\begin{array}{c} \left(2 + \frac{\eta R_{T\epsilon}}{\gamma}\right) - i\eta \\ i\left(\eta + 2\frac{R_{T\epsilon}}{\gamma}\right) + \frac{\eta R_{T\epsilon}}{\gamma} \end{array}\right);$$

$$\approx \frac{1}{2}\left(\begin{array}{c} 2 - i\eta \\ i\left(\eta + 2\frac{R_{T\epsilon}}{\gamma}\right) + \underbrace{\frac{\eta R_{T\epsilon}}{\gamma}}_{\text{neglect}} \end{array}\right) \text{ since } \frac{\eta R_{T\epsilon}}{\gamma} << 2.$$

$$= \left(\begin{array}{c} \left(1 - \frac{i\eta}{2}\right)\left(1 + \frac{i\eta}{2}\right) \\ \frac{i}{2}\left(\eta + 2\frac{R_{T\epsilon}}{\gamma}\right)\left(1 + \frac{i\eta}{2}\right) \end{array}\right) = \left(\begin{array}{c} 1 \\ \frac{i\eta}{2} + i\frac{R_{T\epsilon}}{\gamma} \end{array}\right);$$

∴ ellipticity (polarization ratio) $\approx \boxed{\dfrac{\eta}{2} + \dfrac{R_{T\epsilon}}{\gamma}}$ If $\psi$ is appreciable, the result would be modified to become $$\frac{\eta}{2} + \frac{R_{T\epsilon}}{\gamma} \cos\psi;$$

this can be seen by letting $$\frac{R_{T\epsilon}}{\gamma} \rightarrow \frac{R_{T\epsilon}}{\gamma} e^{-i\psi}$$

in the above steps. The "ellipticity" is only the imaginary part of the lower term (P-component):

$$\left(\begin{array}{c} 1 \\ \frac{i\eta}{2} + \frac{iR_{T\epsilon}}{\gamma} e^{-i\psi} \end{array}\right) = \left(\begin{array}{c} 1 \\ i\left(\frac{\eta}{2} + \frac{R_{T\epsilon}}{\gamma} \cos\psi\right) + \sin\psi \frac{R_{T\epsilon}}{\gamma} \end{array}\right),$$

yielding the above result.
Note the following:
①  For $\epsilon=0$, the ellipticity $=\eta/2$.
②  The new minimum ellipticity point will now occur at:

$$\epsilon = \frac{-\eta\gamma}{2R_T\cos\psi}.$$

③  Consideration of the two oppositely directed beams incident upon (and passing through) the exit mirror can be accomplished by allowing one to possess $\epsilon_1=+|\epsilon|$ and the other $\epsilon_2=-|\epsilon|$. Thus, the 2 curves (ellipticity vs out-of-planeness) will intersect when $|\epsilon|=0$ but have opposite slopes. The minimum points of the curves will lie at equal distances from the origin ($|\epsilon|=0$), but opposite sides. Since the measurement performed is in reality an intensity rather than amplitude measurement, the curves will be quadratic in $\epsilon$. Thus, the result will be two parabolas with intersection and minimum points as mentioned above.

④  $\psi$ is appreciable (not typically the case), the slope of the curves will be modified by the $\cos\psi$ term. The value of ellipticity at $\epsilon=0$ remains unaffected, however.

Note In the derivations presented here, it has been assumed that the retardation properties of the substrate material are essentially constant such that the two transmitted beams, though passing through different portions of the substrate, would see the same birefringence.

Computer Solution: Examples

A computer program was created which calculates the ellipticity as described in this memo without the simplifying approximations. The results come quite close to the values calculated from these approximations, however.

Definitions are as follows:
(i) "Transmission Diff. Ret."=$\psi$
(ii) "P/S TRANS RATIO"=$R_T$
(iii) "Substr. Retard. Angle"=$\eta$
(iv) "Angle Between Axes"=$\xi$

EXAMPLE #1

(FIG. 3)

$\gamma = 5°$   $R_T = 10$   $\xi = 45°$
$\psi = 10°$   $\eta = .31°$

By Note ② on p. A-15, min. ellipticity will occur at:

$$\epsilon = \frac{\eta\gamma}{2R_T\cos\psi} = 2.4 \times 10^{-5} = 5 \widehat{\text{sec}}.$$

Figure 3:
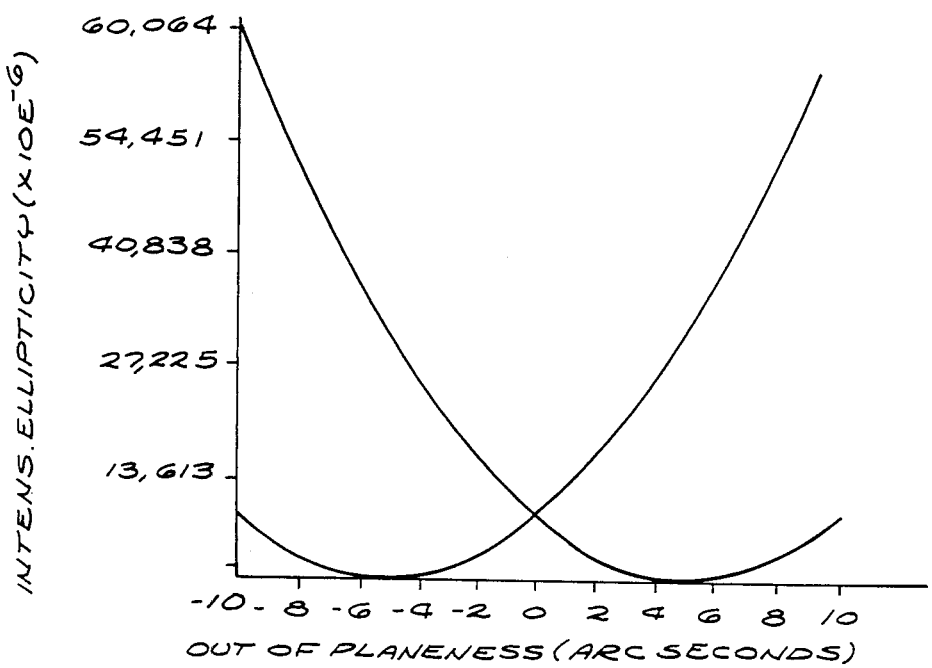
FIGS. 3 through 10 are graphical representations of computer calculated curves for various parameters.

An examination of FIG. 3 confirms this.

EXAMPLE #2

(FIG. 4)
[Same as above except $\psi=90°$]

Figure 4:
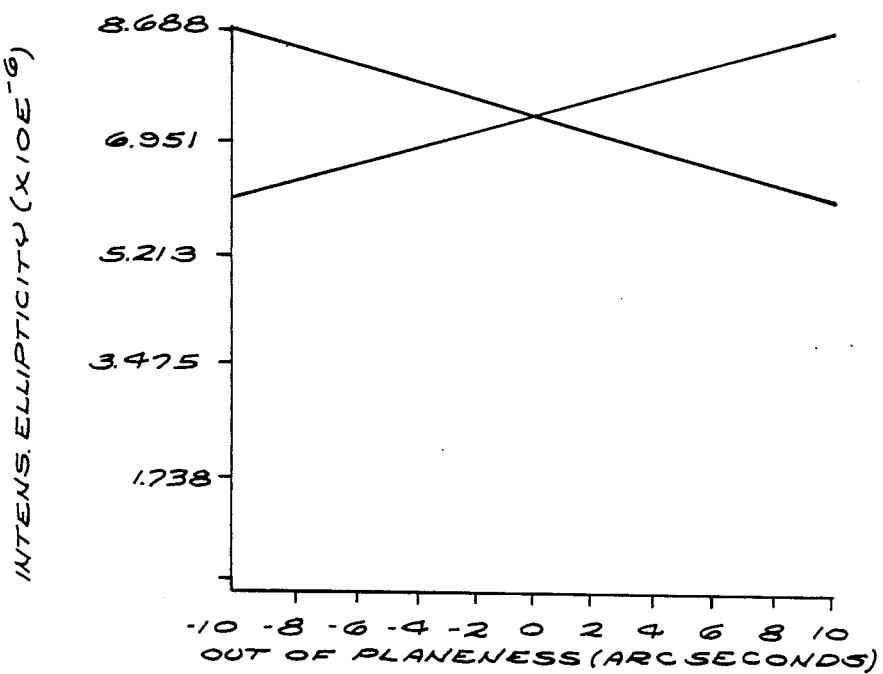
Figure 5:
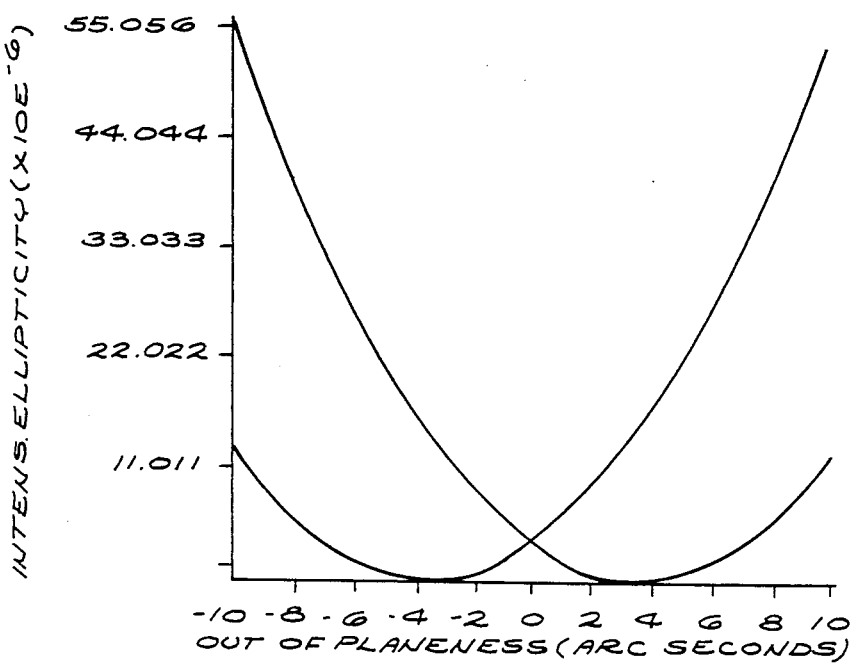
Figure 6:
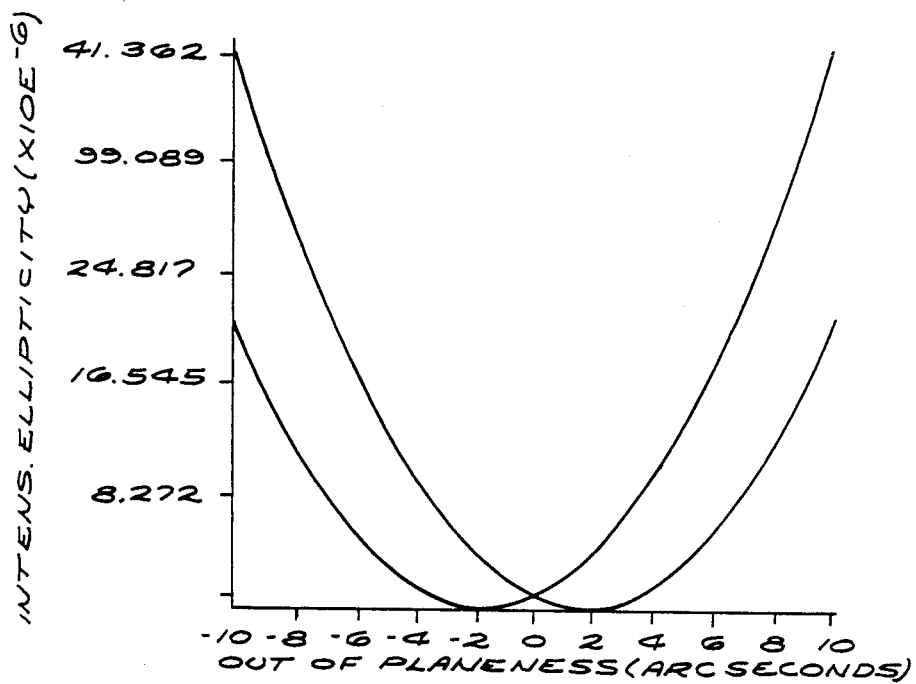
Figure 7:
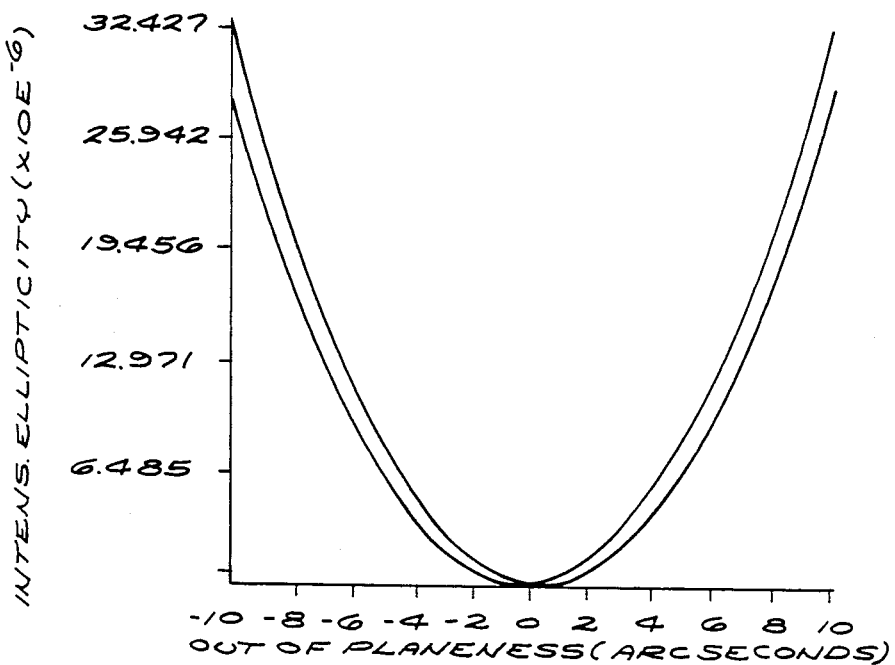
Figure 8:
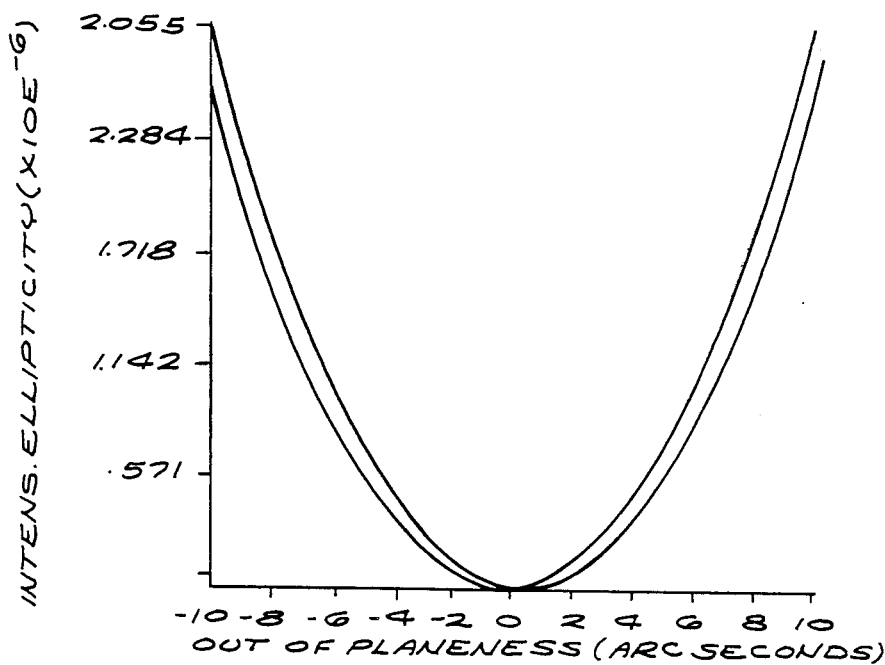

It was previously concluded that as $\psi$ becomes significant, the slope of the curves (not the intersection point) is modified. FIG. 4 confirms this. The intersection (at $\epsilon=0$) should correspond to an ellipticity (intensity) of $\eta^2/4$.

$\eta^2/4 = 7.3 \times 10^{-6}$.

A check of FIG. 4 shows the two curves intersecting just above $7 \times 10^{-6}$.

EXAMPLE #3

(FIGS. 5 to 9)
[Initial conditions the same as in Example #1 except that $\xi$ is varied from graph to graph: 22.5, 10, 2, 0.5 and 0 degrees respectively.]

Note that as $\xi \to 0$, the two curves approach each other and become superimposed. The ellipticity for $\epsilon=0$ likewise $\to 0$ as $\xi \to 0$.

EXAMPLE #4

Figure 9:
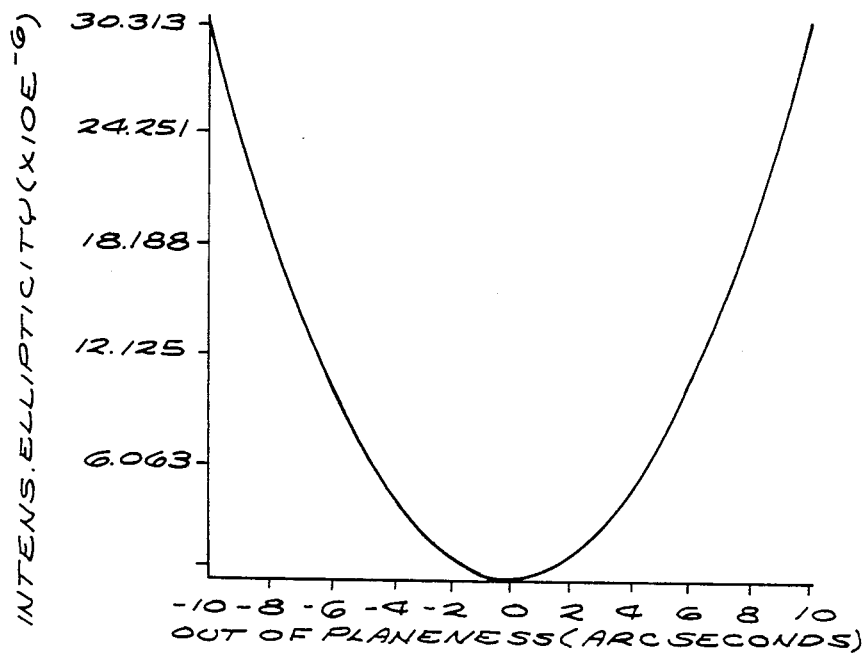
Figure 10:
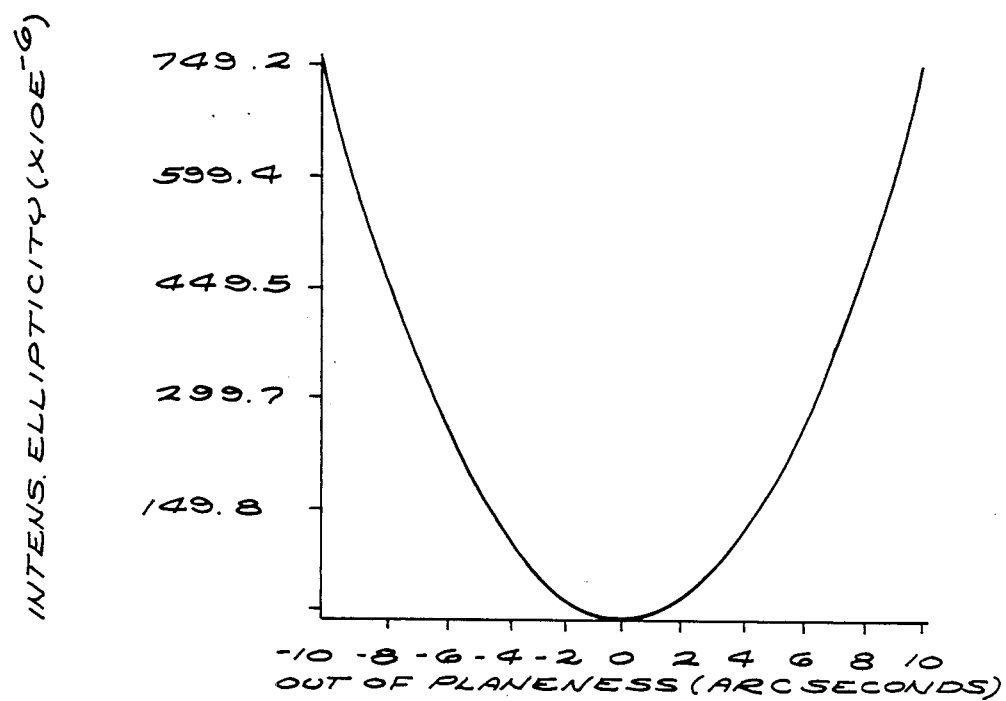

(FIGS. 9 and 10)

[$\gamma 5°$ in A-7 while $\gamma=1°$ in A-8].

Since ellipticity (intensity)

$$= \left(\frac{\epsilon}{\gamma} R_T\right)^2,$$

the max. (extremum) ellipticity for the two graphs should differ by:

$$\left(\frac{\gamma_7 = 5}{\gamma_8 = 1}\right)^2 = 25.$$

The corresponding extrema are $30 \times 10^{-6}$ and $749 \times 10^{-6}$, demonstrating excellent agreement between the "exact" and approximated solutions. In the case of FIG. 10

$\epsilon_{extremum} = 10 \ \widehat{\text{sec}} = 4.85 \times 10^{-5}$ rad, $\gamma = 1° = 0.0175$ rad, and $R_T = 10$.

Thus, $$\left(\frac{R_T\epsilon}{\gamma}\right)^2 = 768 \times 10^{-6} [-3\% \text{ difference}].$$

Conclusion:

Approximate expressions for cavity polarization characterization agree well with "exact" computer solutions. The predicted phenomena support the method for minimizing cavity out-of-planeness ($\epsilon$) which seeks to equalize the measured ellipticity of the CW and CCW resonant signals transmitted through a common exit mirror.

While this invention has been described with reference to a presently-preferred embodiment, its scope is not limited thereto. Rather, it is limited only insofar as defined in the following set of claims and such scope includes all equivalents thereof.

While this invention has been described with reference to a presently-preferred embodiment, its scope is not limited thereto. Rather, it is limited only insofar as defined in the following set of claims and such scope includes all equivalents thereof.

What is claimed is:

1. A method for the alignment of an inertial sensor of the type that includes a frame having an internal cavity that forms a square path with a partially transmissive input mirror and a partially transmissive exit mirror fixed to a first and second adjacent mounting surfaces of the frame respectively, the method comprising the steps of:
   a. directing first and second input beams of light onto the input mirror and into the cavity;
   b. intercepting said first and second input beams of light prior to their incidence upon the input mirror, with first and second input polarizers respectively;
   c. measuring the extinction ratios of first and second output beams of light at the exit mirror;
   d. translating a first curved mirror of the frame in a predetermined direction;
   e. effecting an equal and opposite translation of a second curved mirror of the frame so as to change the extinction ratios of said output beams; and
   f. repeating said translations of said first and second curved mirrors until said measured extinction ratios are substantially equal.

2. A method as defined in claim 1 wherein said step of measuring the extinction ratios includes the step of intercepting said first and second output beams with first and second output polarizers respectively.

3. A method as defined in claim 2 wherein said step of measuring the extinction ratios further includes the step of detecting the intercepted first and second output beams with first and second photodetectors respectively.

4. A method as defined in claim 3 wherein said step of detecting includes the step of using first and second photomultiplier tubes.

5. A method as defined in claim 4 further including the step of using an external light source for generating said first and second input beams of light.

6. A method as defined in claim 5 further including the step of verifying the calibration of said external light source.

7. A method as defined in claim 6 further including the step of verifying the calibration of said photodetector means.

8. A method as defined in claim 7 wherein said step of verifying the calibration of said external light source and said photodetecting means includes orienting said input polarizers and said output polarizers for an s-polarization state.

9. A method as defined in claim 8 wherein said step of verifying the calibration includes the step of using a first and second neutral density filters intermediate the first and second intercepted output signals, prior to being detected by said first and second photomultiplier tubes, for maintaining said first and second photomultiplier tubes below their saturation levels.

10. A method as defined in claim 9 wherein the step of measuring the extinction ratios further includes the step of re-orienting said first and second output polarizers for a p-polarization state, while maintaining said first and second input polarizers oriented for an s-polarization state.

11. A method as defined in claim 10 wherein said step of measuring the extinction ratios further includes the step of removing said first and second neutral density filters.

12. An apparatus for the alignment of an inertial sensor of the type that includes a frame having an internal cavity that forms a square path with a partially transmissive input mirror and a partially transmissive exit mirror fixed to first and second adjacent mounting surfaces of the frame respectively, the apparatus comprising, in combination:
    a. means for directing first and second input beams of light onto the input mirror and into the cavity;
    b. first and second input polarizers for intercepting said first and second input beams of light prior to their incidence upon the input mirror;
    c. means for measuring the extinction ratios of first and second output beams of light at the exit mirror;
    d. means for translating a third mirror of the frame in a predetermined direction;
    e. means for effecting an equal and opposite translation to a fourth mirror of the frame so as to change the extinction ratios of said output beams; and
    f. means for repeating said translations of said third and fourth mirrors of the frame until said measured extinction ratios are substantially equal.

* * * * *